Nov. 16, 1948.    R. M. SHAW, JR    2,453,868
APPARATUS FOR AUTOMATICALLY BENDING WORK
SUCH AS TUBING INTO SERPENTINE COILS
Filed Feb. 20, 1947    7 Sheets-Sheet 1

INVENTOR:
Ralph M. Shaw, Jr.,
BY Paul & Paul
ATTORNEYS.

Nov. 16, 1948.                R. M. SHAW, JR                        2,453,868
                   APPARATUS FOR AUTOMATICALLY BENDING WORK
                     SUCH AS TUBING INTO SERPENTINE COILS
Filed Feb. 20, 1947                                     7 Sheets-Sheet 2

WITNESSES                                               INVENTOR:
                                                   Ralph M. Shaw, Jr.,
                                              BY
                                                        ATTORNEYS.

Nov. 16, 1948.                    R. M. SHAW, JR                    2,453,868
              APPARATUS FOR AUTOMATICALLY BENDING WORK
                SUCH AS TUBING INTO SERPENTINE COILS
Filed Feb. 20, 1947                                    7 Sheets-Sheet 3

INVENTOR:
Ralph M. Shaw, Jr.,
BY Paul & Paul
ATTORNEYS.

Nov. 16, 1948.                R. M. SHAW, JR                    2,453,868
                 APPARATUS FOR AUTOMATICALLY BENDING WORK
                      SUCH AS TUBING INTO SERPENTINE COILS
Filed Feb. 20, 1947                                        7 Sheets-Sheet 4

WITNESSES                                              INVENTOR:
Hubert Fuchs                                        Ralph M. Shaw, Jr.,
Thomas W. Kerr Jr.                          BY      Paul & Paul
                                                       ATTORNEYS.

Patented Nov. 16, 1948

2,453,868

UNITED STATES PATENT OFFICE 2,453,868

APPARATUS FOR AUTOMATICALLY BENDING WORK SUCH AS TUBING INTO SERPENTINE COILS

Ralph M. Shaw, Jr., Edgewater Park, N. J., assignor to Pedrick Tool & Machine Company, Philadelphia, Pa., a corporation of Pennsylvania Application February 20, 1947, Serial No. 729,808

15 Claims. (Cl. 153—2)

This invention has general reference to apparatus for bending bars, tubes and so forth into coils, while it relates more particularly to the species or forms thereof for operating on metal tubing of different gauge and diameter.

The primary object of this invention is to provide a novel structure and assembly of means capable of adjustment to turn out single or multiple bends of conventional degree, as well as bends of unusual form, such bends being "set" and not liable to react but which will retain their intended shape.

Another object is to provide a bending machine capable of turning out multifarious and diverse single or multiple bends of uncommon and varied character, with positive assurance they will be accurately shaped.

A further object is to provide an automatically controlled bending machine which embodies a pair of or double bend formers either of which may be the one applying the bending moment and the other of which serves as the one upon which such moment is applied; as well as other features of construction which, taken together, render the machine flexible, economical, and positively satisfactory in operation.

While the foregoing definitions are indicative, in a general way, of the aims of this invention, other objects with ancillary advantages will be evident to those skilled in the art upon a full understanding of the construction, arrangement, and combinations of parts hereinafter fully disclosed, as well as the manner of controlling the same; but it will also be appreciated that the invention is susceptible of other embodiment, or structurally modified forms, coming equally within the terms and scope of the claims.

In describing the form of this invention exemplified by the drawings herewith specific terms will be employed for the sake of clarity, but it is to be understood the scope of said invention is not thereby limited; each such term being intended to embrace all reasonable equivalents which perform the same function for an analogous purpose.

Figure 1:
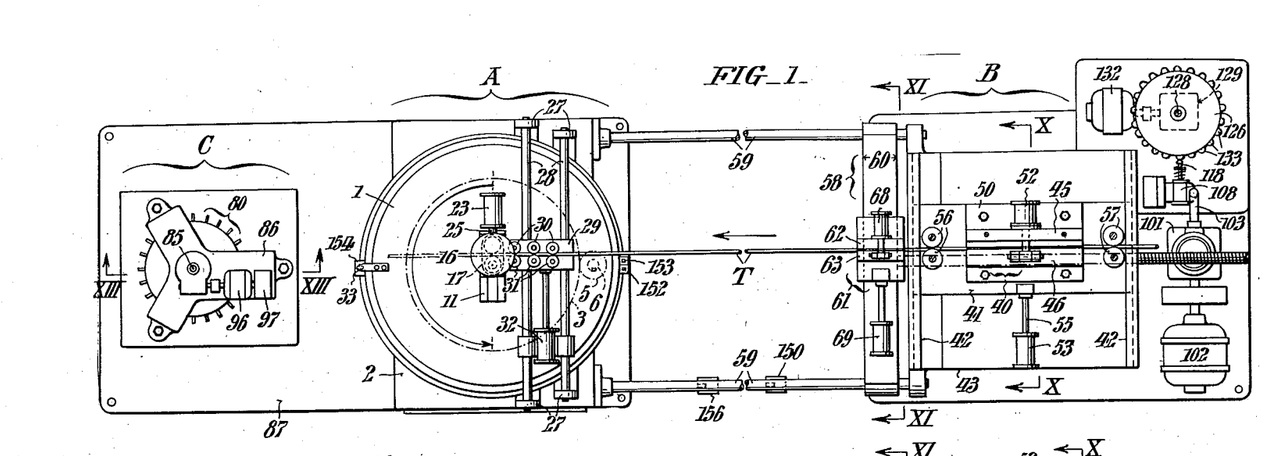
Fig. 1 is a top plan view of a tube bending apparatus or machine embodying this invention, the bending-table being shown in position before the first feeding-stroke, and as set for making a left-hand bend.
Figure 2:
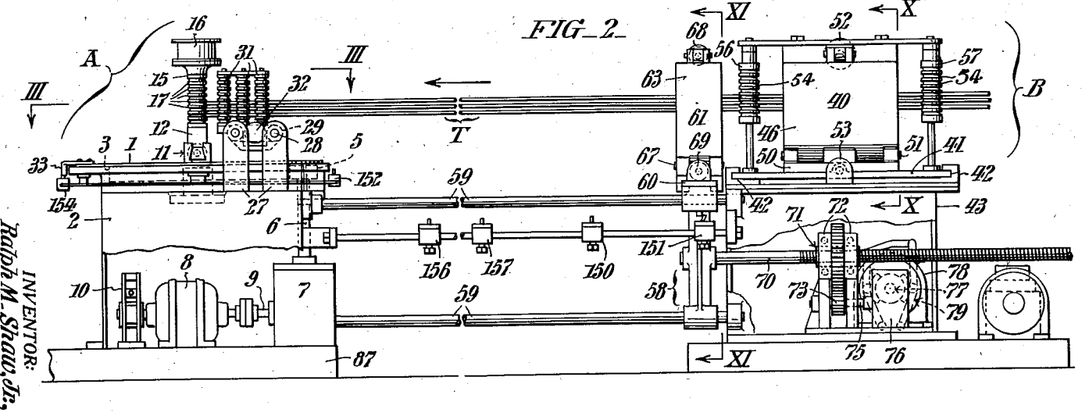
Fig. 2 is a side elevation of the organization looking upwardly from below Fig. 1, with a portion at the left-hand side thereof omitted to compact the view.

Referring first and more particularly to Figs. 1 and 2 of the drawings, it is to be observed that my novel bending apparatus or machine comprises a bending mechanism comprehensively designated A; a feeding means B, by which metal elements such as tubing T is intermittently advanced, and a timing control C; such mechanism, means and control being serially arranged conveniently, although not essentially, as shown.

Figure 3:
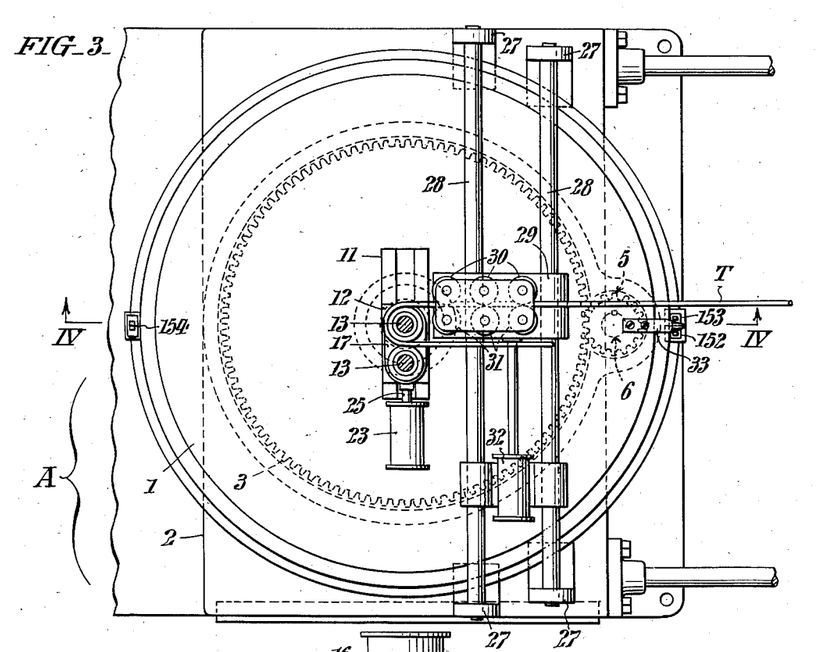
Fig. 3 is a fragmentary horizontal section, drawn to a larger scale and taken as indicated by the angled-arrows III-III in Fig. 2, while showing the left-hand bend as completed.
Figure 4:
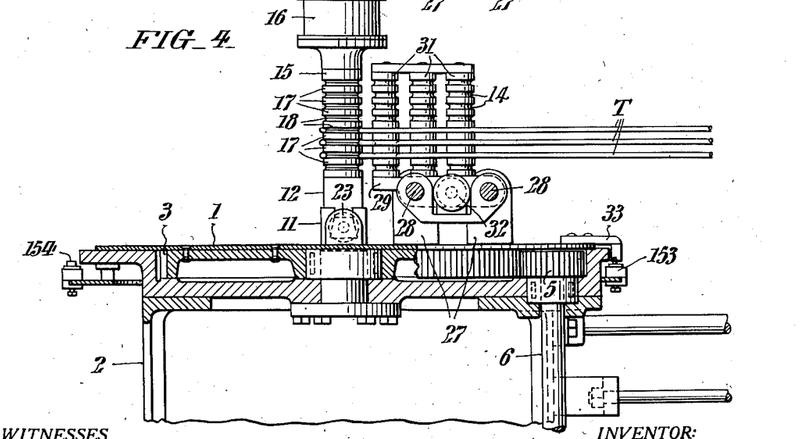
Fig. 4 is a fragmentary sectional elevation taken as indicated by the angled-arrows IV-IV in Fig. 3.

The bending mechanism A comprises a circular table 1, which is rotatively supported on the top of a hollow stand or housing 2, and said table has at its under-side an attached bull-gear 3, in mesh with a pinion 5 at the upper end of the vertical out-put shaft 6 of a speed-reduction unit 7. A reversible electric drive-motor 8 within the housing 2 is directly connected to the in-put shaft 9 of the speed-reduction unit 7, and associated therewith is a magnetic brake 10. Secured to the top of the table 1, by suitable means—not indicated, with its axis passing through the center of said table is a dove-tail guide 11 for a slide block 12, said block having two spaced upstanding posts 13, Figs. 3 and 6, which are connected at their tops by a cross-member 15, whereon is mounted a pressure-fluid cylinder 16. Impaled on the posts 13 are a series of somewhat elliptical-shaped or elongated die elements 17 having embossments which jointly provide bend-forming grooves 18, see Fig. 6 to best advantage, of semi-circular cross-section in concentric relation to the axes of said posts 13, and circular openings 19, in the planes of their abutment, for passage of as many tubes T to be bent. Normally to facilitate feeding of the tubes T between the die elements 17, the latter are spread apart slightly, as indicated at 18, in Fig. 8, by aid of washer springs 20; but, during bending, they are forced together when pressure fluid is admitted to the cylinder 16, to act downwardly upon the piston 21 within said cylinder, whereas the piston rod 22 thereof is secured at its lower end in the upper one of the elements 17, as shown in Fig. 6. For the purpose of shifting the slide-block 12 in its guide 11, as later on explained, I have provided another pressure fluid cylinder 23 which is fixedly mounted on the table 1 and which has the rod 25 of its piston 26 directly connected to said slide; while corresponding means may be fitted in connection with the upper ends of the posts 13, in an obvious manner and needing no further disclosure herein as it will be self-evident to those conversant with the art. Bridged crosswise over the table 1 and having their ends secured in upstanding brackets 27, rising from the stand or housing 2 at opposite sides, are a pair of parallel rods 28 providing trackway for a carriage 29, see Figs. 3–5 to best advantage, whereon are mounted laterally spaced groups of rollers 30 and 31 which are grooved at 14, Fig. 4, to receive the tubes T between them, and which also cooperate to hold back or restrain said tubes during bending, as well as serving to direct them toward the bight of the die elements 17 during feeding. The carriage 29 is arranged to be moved along track rods 28 by means of a pressure-fluid cylinder 32 which is rigidly supported by said rods. Affixed to the table 1, at its periphery, is a finger 33 which as said table rotates during the bending operation, is adapted, as also later on explained, to operate limit switches 152, 153, or 154 located at definite intervals around the housing 2.

Figure 10:
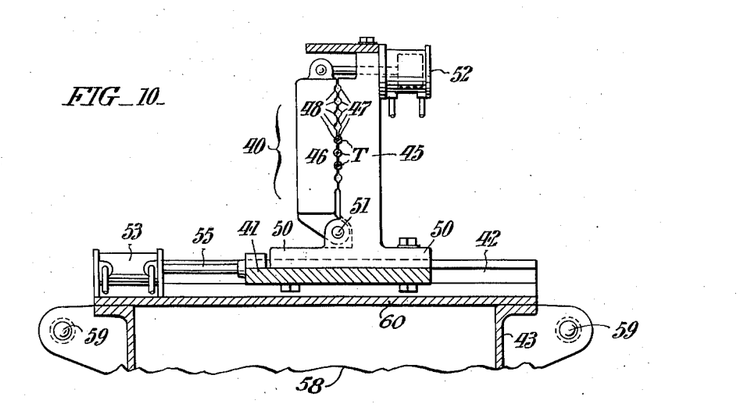
Figs. 10 and 11 are transverse sectional views taken as respectively indicated by the angled-arrows X-X and XI-XI in Figs. 1 and 2.
Figures 11, 12:
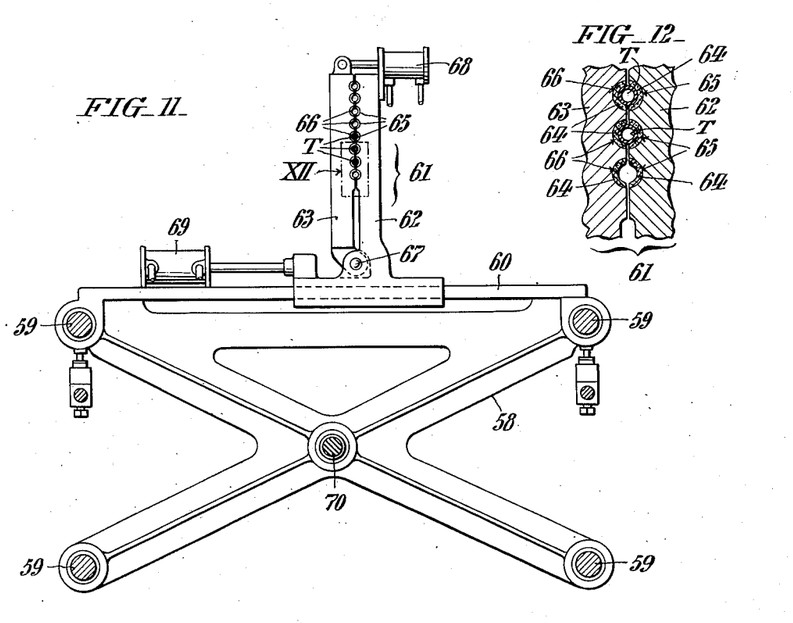
Fig. 12 is a fragmentary view, in section, showing certain details which will be hereinafter specifically described.

The tube feeding means B includes a straightener in the form of an upright clamp 40, Figs. 1, 2, and 10, supported on a flat bed 41 whereof the opposite end edges are engaged in stationary grooved guide-tracks 42 extending crosswise of the top of another hollow stand or housing 43 which is spaced a substantial distance from the bending mechanism A. The component jaws 45 and 46 of the clamp 40 have opposing horizontal grooves 47 and 48, Fig. 10, at levels corresponding to the grooves 14, Fig. 4, of the rollers 30 and 31, of the bending mechanism A, for passage of the tube or tubes T. The jaw 45 has flanges 50 whereby it is secured as by bolts 44 for example, to the bed 41, and near its bottom affords a hinge connection 51 for the jaw 46 which is opened and closed by means of a pressure fluid cylinder 52 attached to the fixed jaw 46 at the top. The clamp 40 is shiftable transversely of the stand or housing 43 by means of a pressure-fluid cylinder 53 whereof the piston rod 55 is connected to the bed 41. Also mounted on the bed 41, forwardly and rearwardly of the clamp 40 are cooperative pairs of freely-revolving guide rollers 56 and 57 having circumferential grooves 54, Fig. 2, in line with grooves 47, 48 in the clamp jaws 45 and 46. The feeding means B further includes a carriage 58, Figs. 1, 2, 10, and 11, which is confined to travel longitudinally of the machine upon a plurality of guide rods 59 that extend between the housings 2 and 43. Slidable transversely of the machine on a track-bar 60, Figs. 1 and 2, and carried by the upper guide-rods 59, is an upright clamp 61 which comprises two jaws 62 and 63, Fig. 11, with opposing grooves 65 and 66, for reception of the tubes T, said grooves being lined as shown at 64, in Fig. 12, with compressible material, such as rubber or felt for example, or a knurled surface of hardened steel, or a knife edge of hardened steel, which will compress or grip the tubing T and thus effect a hold-back action. The jaw 62 is fixed and the jaw 63 is hingedly connected thereto at the bottom, as indicated at 67; while the movable jaw 63 is likewise operable by means of a pressure-fluid cylinder 68, Figs. 1, 2, 11 and 15. Movement of the clamp 61 along the track-bar 60 is effected by means of a separate pressure-fluid cylinder 69. Extending from the carriage 58, at the center, is a shaft 70, see Fig. 2, having a screw-thread engaged by a gear-nut 71, which is rotatively held between bearing standards 72 within the base or housing 43, that meshes a pinion 73 on the output shaft 75 of a speed-reduction unit 76. As shown the in-put shaft 77 of the unit 76 is direct-connected to the shaft on an electric drive motor 78 provided with a magnetic brake 79.

The timing control mechanism C, Figs. 1, 2, 13, and 14, comprises a rotor 80 which includes four circular disks 81, 82, 83 and 84, fixed to a vertical shaft 85, journaled in suitable bearings within a tri-arm frame structure 86. This frame structure 86 is mounted on a platform 87, Figs. 2 and 13, which also supports the housing 2 of the bending mechanism A. The disks 81, 82, 83 and 84 are respectively provided with twenty-four, for instance, equally spaced radial-holes for a series of interchangeable indexing pins 88, 89, 90 and 91. From Fig. 14 it will be noted that the pins, 88–91 are differently arranged on the respective disks 81–84 and, for convenience of distinction, are contrastingly-shaded; those on the disk 81 being plain; those on the disk 82 being line-shaded; those on the disk 83 being stippled; and that, or those, on the disk 84 indicated in solid black; while they are arranged to produce a shape or bend S such as typically shown in Fig. 9. As the rotor 80 is operated the pins 88–91, on the respective disks 81–84 serve to actuate the roller arms of correspondingly allocated limit-switches 92, 93, 94 and 95, suitably supported in the frame structure 86, and such switches are arranged in an electric control system—not shown—to open and close said switches as required. The means for actuating the rotor 80 of the timing control mechanism C includes an electric motor 96 conveniently mounted on a frame 86, at the top, together with a magnetic brake 97 therefor; while the shaft 98 has a worm 99 in mesh with a worm-gear 100, at the upper end of the shaft 85 of said rotor.

Figure 15:
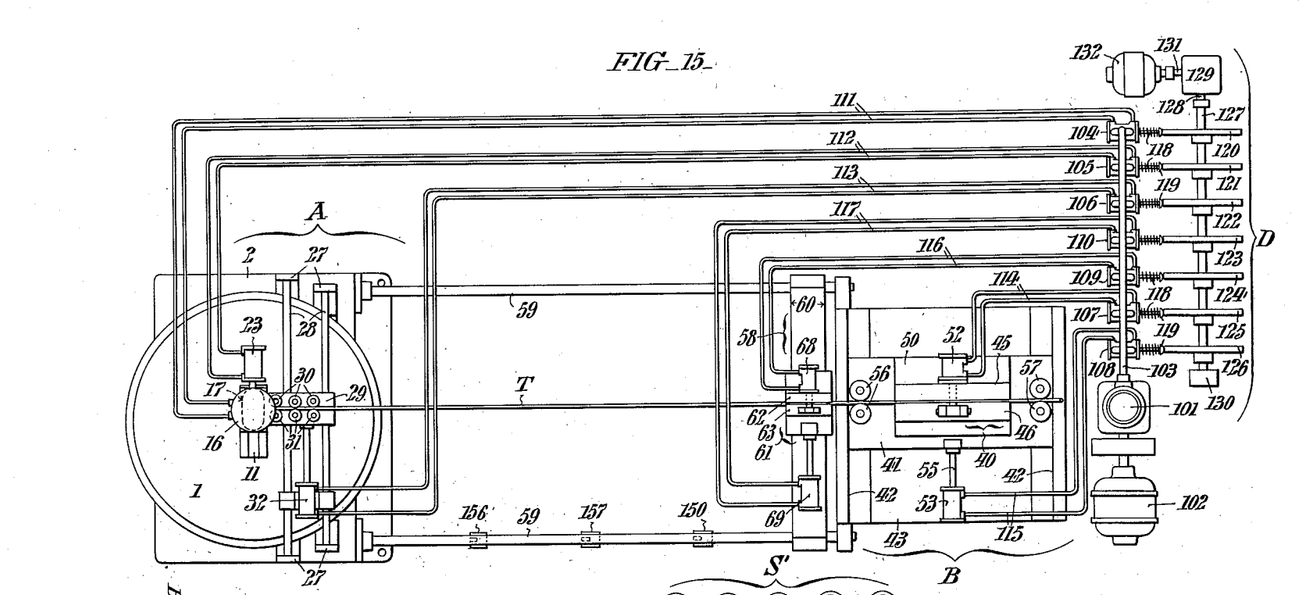
Fig. 15 is a diagrammatic view showing the compressor and operating mechanism or device, generally designated D, with the piping arrangement to the different pneumatic cylinders for clamping and forwarding the tubes.

Referring now to Fig. 15, more particularly, which shows one typical means for effecting individual actuation of the several pressure-fluid cylinders 16, 23, 32, 52, 53, 68 and 69 by aid of a master device or control, comprehensively designated D, in synchronism with the timing means C hereinbefore explained. This device D includes a fluid or air compressor 101 conveniently driven by an electric motor 102; while the compressor 101 is equipped with a manifold 103, serving appropriate valves 104—110 having respectively associated supply- lines 111—117 connected to the pressure cylinders 16, 23, 32, 52, 53, 68, and 69 aforesaid. The valves 104—110 each includes an outwardly-influenced stem 118, the respective heads 119 whereof are under the control of a corresponding number of disks 120—126, made fast on a common shaft 127, in turn coupled at one end to the out-put shaft 128 of a speed-reduction unit 129, having rotary support at its other end in a bearing 130; whereas the in-put shafts 131 of the unit 129 is directly connected to an electric motor 132. At this juncture, it is to be particularly noted that the several disks 120—126 are provided with correspondingly allocated equally-spaced circumferential buttons 133, Fig. 1, in number equal to and in synchronism with the holes for the indexing pins 88—91 previously described in connection with the timing control C; accordingly further elaboration herein is deemed unnecessary.

Figure 13:
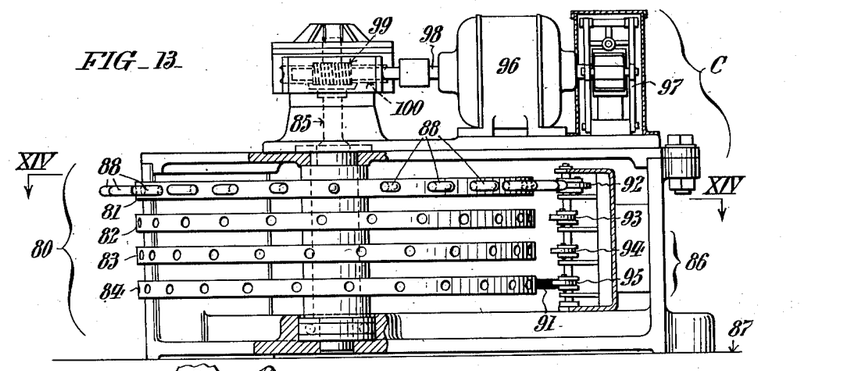
Fig. 13 is a detail sectional view taken as indicated by the angled-arrows XIII-XIII in Fig. 1, and drawn to larger scale for clearer illustration of details hereinafter fully explained.
Figure 14:
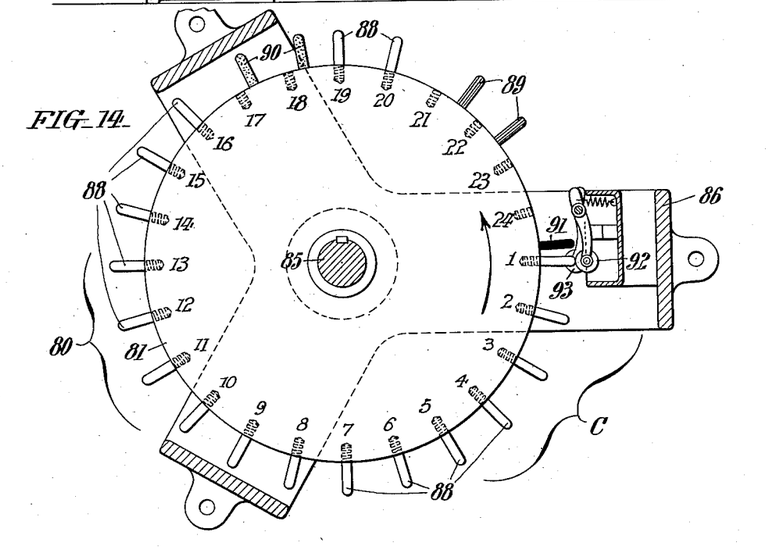
Fig. 14 is a horizontal section taken as indicated by the angled-arrows XIV-XIV in Fig. 13.

Having explained the structural aspects of this invention I will now describe its operation in connection with a typical bending problem such as illustrated by Fig. 9. This particular problem involves the formation of sixteen reverse bends $a$ having straight runs each two-feet long—as read from the left-hand of Fig. 9 towards the right-hand thereof—followed by two reverse bends $b$ having straight runs six-feet long; said bends $b$ being succeeded by two reverse bends $c$ having straight runs two-feet long, followed by two reverse bends $d$ having runs four-feet long that, in the aggregate, total twenty-two reverse bends or twenty-two consecutive operations. It is to be here noted that in the problem above outlined there is included three series of bends, or two-foot, four-foot and six-foot bends; but of the series there are sixteen two-foot bends $a$ and $c$; with two four-foot bends $d$ and two six-foot bends $b$ separated by two two-foot bends. Referring now to Figs. 13 and 14 it is to be particularly noted that the circular disk 81 will start at a radial hole, appropriately designated number one, to be consecutively followed by sixteen other ones each having an indexing pin 88 inserted therein, which are succeeded by a gap including two empty radial holes and then two more holes with plugs 88 therein. In the next disk 82 which, as hereinbefore noted, is also fast on the vertical shaft 85 and rotates with the disk 81, there will be sixteen blank holes, then two holes having indexing pins 89 therein, with the remaining circumferentially spaced holes left blank; while in the following disk 83 there will be 20 blank holes followed by two holes having pins 90 therein with the remainder of the holes therein blank; whereas in the lowermost disk 84 there will be twenty-three blank holes and one hole having the single pin 91 therein.

It is to be observed that the axis of one of the posts 13, associated with the die-elements 17, must coincide with the exact center of the bending or circular table 1 during the bending operation; whereas the respective centers of both posts 13 are shifted alternately for the successive right and left-hand bends under actuation of the pressure fluid cylinder 23; whereas the shifting of the die elements 17, as aforesaid, ensures positive co-operation of all the related actuable units along the entire length of the machine. In other words, the pressure cylinder 53 controlling the straightener-device 40, the cylinder 69 for the clamp-device 61, as well as the cylinder 32 governing the movement of the guide roller assembly carriage 29, all come into action at the same time, or simultaneously, under master-control of the device D.

Assuming now that a length, or multiple lengths of tubing T is, or are, suitably fed to the grooves of the guide rollers 57, for production of a shape S such as shown by Fig. 9, the successive steps involved are as follows, commencing with the showing of Fig. 1; as the tube or tubes T are fed through the device 40 all "kinks" or undulations therein are straightened out before the leading end or ends thereof are engaged in the clamp feeding-device 61; whereupon the motor 78 is set in operation to progress the carriage 58, to the left-hand in Figs. 1 and 2, until it contacts the limit switch 150 to feed the requisite length for the first bend $a$ and straight run, as indicated in dot-and-dash lines in Fig. 1, through the rollers 30, 31 and die elements 17. At this point clamping pressure in the cylinder 68 is released and the motor 78 reversed to bring the tube-feeding carriage 58 back to its initial position, whereupon a stop switch 151, Fig. 2, stops said motor 78.

To effect a left-hand bend, after the tube or tubes T has, or have, been forwarded as above set forth, the die cylinder 16 presses the die-elements 17 together in preparation for the bending operation; while the device 40 is also activated by the cylinder 52 to securely restrain the tube or series of tubes T against shifting during such bending operation. The motor 8 is now energized to turn the table 1, through the means 9, 6, 5 and 3, counter-clock-wise through a half-turn until the finger 33 engages the limit-switch 152, Figs. 3 and 4, whereupon said motor 8 is reversed. The pressure exerted in the cylinder 16 and 52 is now shut-off, while the table 1 is returned clockwise by motor 8 to its normal or starting position, whereupon said motor 8 is stopped by engagement of the finger 33 with the switch point 154, as readily understood by those conversant with the art. Movement or re-setting of the die-elements 17 relative to the longitudinal axis of the bending mechanism A and table 1 in readiness for making a right-hand bend, as well as re-setting of the device 40, clamping means 61, and guide-roller carriage 29, by the pressure cylinders 23, 53, 69 and 32 respectively, results in positioning of the recited means as shown by the full-line position of Fig. 5.

Figure 5:
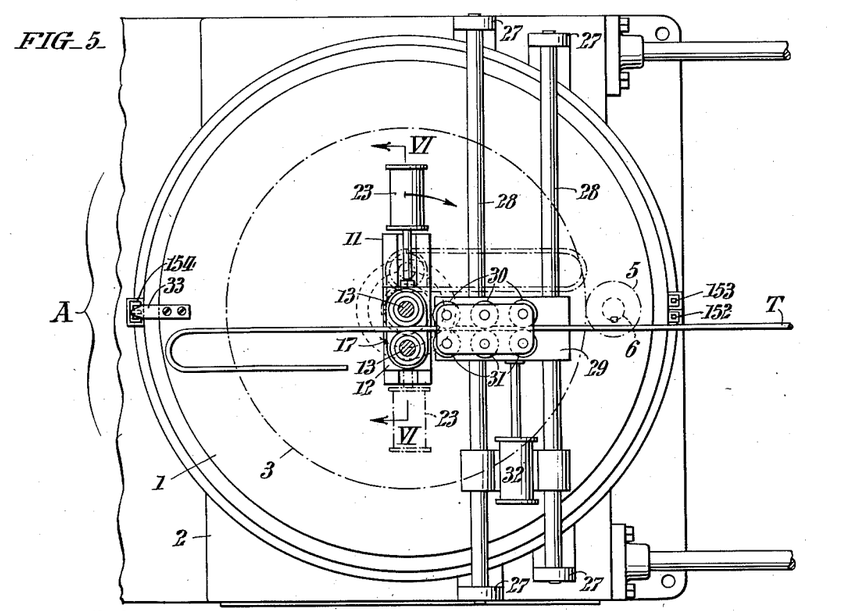
Fig. 5 is a view corresponding to Fig. 3 but showing a further step in the bending of a tube, or with the tube advanced preparatory to making a right-hand bend.
Figures 6, 7, 8, 9:
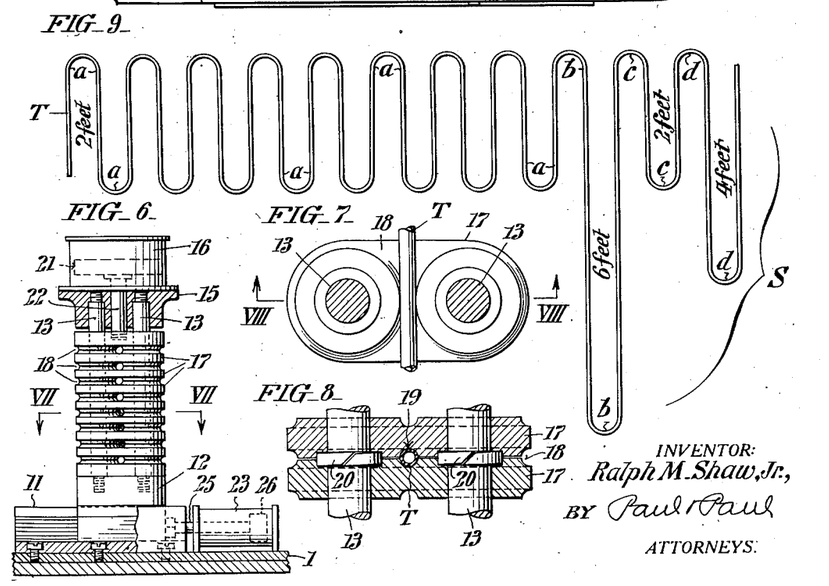
Fig. 6 is a fragmentary detail section, taken as indicated by the angled-arrows VI-VI in Fig. 5.
Fig. 7 is a detail sectional view taken as indicated by the angled-arrows VII-VII in Fig. 6, and drawn to a larger scale.
Fig. 8 is a fragmentary sectional view taken as indicated by the angled-arrows VIII-VIII in Fig. 7.
Fig. 9 is a view exemplifying one typical form of bend which can be made with the apparatus.

The clamping device or tube gripping means 61 is again subjected to pressure influence, the motor 78 started with resultant progressive feeding of the tube or tubes T until, as before set forth and best understood from Fig. 5, the limit switch 150 is reached, whereupon the motor 78 is again reversed. Now, it will be apparent that, after releasing pressure in the cylinder 68, the carriage 58 will return to its starting point, as shown in Figs. 1 and 2, and said motor 78 again be stopped. After re-forwarding of the tube or tubes T, as just set forth, pressure is again exerted on the die-elements 17 and device 40; whereupon the motor 8 is energized, but this time to effect a clock-wise half-turn of the table 1 or make a right-hand bend, until the finger 33 again engages the limit switch 153, with resultant production of the bend shown by the dot-and-dash indication above the horizontal center line in Fig. 5. Pressure on the die-elements 17 and the clamping jaws 45, 46 is again released and the table 1 returned counter-clockwise—by the now reversed motor 8.

Before the next left-hand or counter-clockwise bend is made the shifting operations above explained are repeated to bring the die-elements 17 and related units from the position of Fig. 5 to that of Fig. 1 and, after the feeding-operation is effected by the carriage 58, the cycle of left-hand and right-hand bends $a$ with the intervening straight runs is completed.

For different lengths of straight runs other variably adjustable limit switches 156 and 157 are provided, the same taking care of six and four-foot runs included in the shape 5 of Fig. 9. Furthermore, it will now be apparent that when pressure is admitted from the manifold 103 to the valve 109, under control of the associated disk 124, and thence by way of one of the supply lines 116 for movement of the piston in the cylinder 68 in the proper direction to close the jaws 62, 63 of the feeding device 61 into gripping engagement with the tube or tubes T, that upon starting the motor 78 said tube or tubes will be advanced a distance of two-feet preparatory to making a right or left-hand bend $a$, such procedure being followed with formation of alternating straight advances of the tube or tubes T and formation of right and left bends $a$ until sixteen such bends $a$ are completed, for the form of Fig. 9; whereupon the device 61 is advanced six-feet with formation of the two bends $b$; to be followed by two-feet advances of said device and production of the bends $c$; and finally by two-four-feet advances and formation of the terminal bends $d$. It will also be now apparent that when the twenty-two bends $a$—$d$ have been made the full complement of twenty-four holes for the pins 88—90 in the disks 81, 82 and 83 of the timing control C have not all been used but that the bending cycle is completed for the shape S. However, the single pin 91 in the lowermost disk 84 of the timing control C will now come into action and cause the re-set motor 96, Fig. 13, to operate and return said timing control C to its initial or normal position, and through appropriate means, not shown, stop the machine; whereupon the operator can now re-load the machine with a tube or tubes T ready for the next bending cycle. Furthermore, when desirable the machine shown and described may be equipped with ejection and loading adjunctive means, not indicated, arranged for activation by the single plug 91 in the disk 84 of the timing control C, so that new tubes T may be entered into said machine as the shapes S are removed therefrom.

Figure 16:
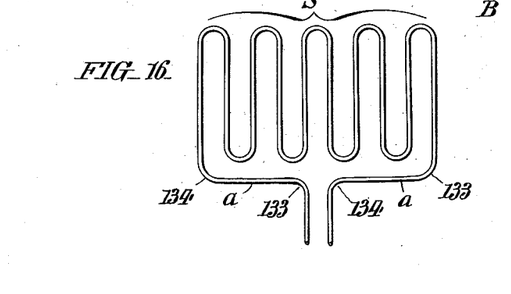
Fig. 16 is a view illustrative of a different type of bend, or of one more particularly useful in refrigerating apparatus, which can be readily produced in my improved bending machine by simply re-setting the timing mechanism C and device D, as hereinafter fully explained.

Fig. 16 illustrates what may be termed a pronged-shape S′ including left and right-hand angle-bends 133, 134 respectively with relatively intervening straight-runs $a$, as before explained in respect to Fig. 9; it being particularly noted that the bends 133, 134 are made by imparting quarter-turns to the table 1 in the needful directions. Furthermore, it is to be also understood that any other desired angles or bends can be produced by the machine illustrated and hereinbefore disclosed by selective changing of the pins 88—91 and re-setting of the limit switches 152, 153, and by varying the radius of the die-element grooves 18.

Figure 17:
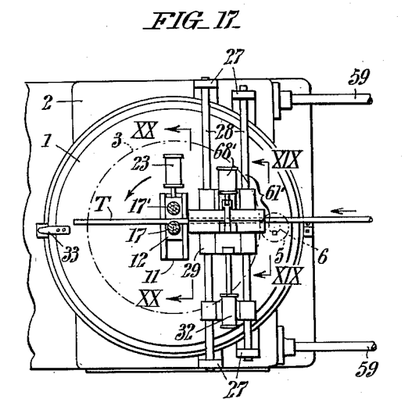
Fig. 17 is a fragmentary plan view corresponding somewhat to the bending mechanism captioned A, in Figs. 1 and 2, but showing a modified form of the implementation with a different arrangement of the clamp mechanism to rigidly hold the stock during the bending operation.
Figure 18:
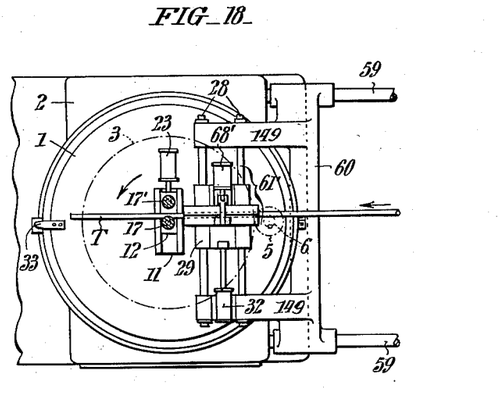
Fig. 18 is a plan view somewhat similar to the preceding figure but showing location and mounting of the clamp mechanism where it functions, also to feed the stock forward into bending position.

Referring to Figs. 17 and 18 which primarily show a modified form of bending elements or die units and a substitute for the hold-back means 29—31 of Figs. 1 to 5, whereby the stock or tubes T being operated on is restrained in juxtaposition to the shiftable die units 17, 17′, during rotation of the circular table 1, or during the bending operation, as hereinbefore set forth. It is here to be expressly noted that with the means referred to, by turning the dies 17, 17′ about the shiftable center of rotation aligned with the axis of the circular table 1 the tube or tubes T, is, or are, respectively, bent somewhat analogous to a wire being wrapped around a reel, see Figs. 3, 5 and 8. This procedure is well adapted to the bending of relatively small diameter pipe stock such as annealed copper tubing for use in refrigerating apparatus and the like.

Figures 19, 20, 21, 22:
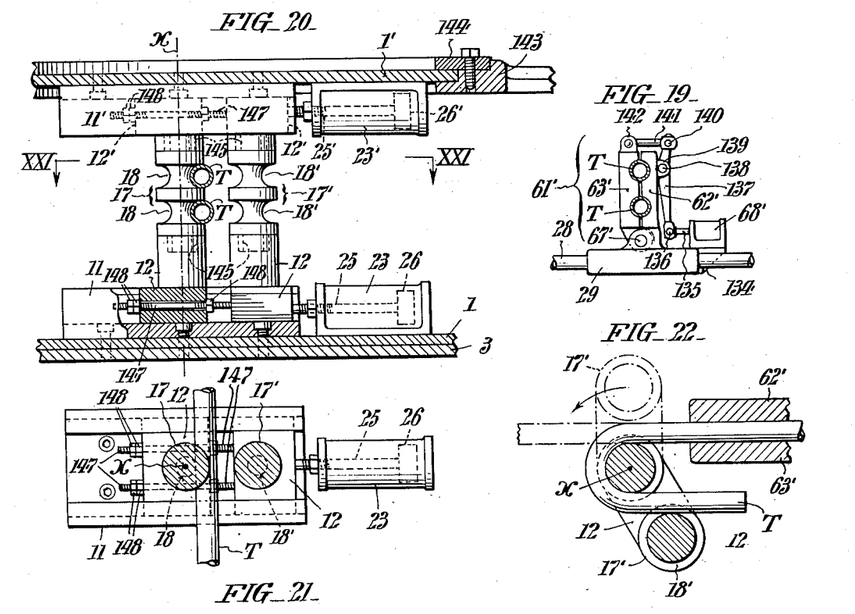
Fig. 19 is a detail view taken approximately as indicated by the broken line and arrows XIX-XIX in Fig. 17, but drawn to a larger scale in order to better illustrate how increased pressure may be applied to the stock.
Fig. 20 is a sectional view taken approximately as indicated by the angled-arrows XX-XX in Fig. 17 but drawn to larger scale to better clarify structural details hereinafter fully explained.
Fig. 21 is a sectional plan view taken as indicated by the angled-arrows XXI—XXI in Fig. 20.
Fig. 22 is a detail view diagrammatically showing how the stock bending operation is effected by the means of Figs. 20 and 21.

However, when dealing with tubing T which is not thoroughly annealed, or should it be of the larger diameter species where greater clamping pressure is highly desirable I preferably make use of the means comprehensively designated 61′ in Fig. 19. This means comprises a carriage 29 movable along the track rods 28 as hereinbefore set forth, but embodying an upright clamping device 61′ similar to the device 61 hereinbefore set forth in connection with Figs. 1, 2 and 11, accordingly corresponding reference characters having a prime exponent are applied as far as possible to obviate unnecessary repetitive explanation. That is to say, the device 61′ embodies a stationary and a relatively pivotal jaws 62′, 63′, respectively, and which are hinged together at 67′; while the carriage 29 is provided with a bracket projection 134 and a pressure-fluid cylinder 68′, the piston rod 135 whereof is operatively connected at 136 to the lower end of a power-multiplying lever 137, fulcrumed at 138 to a projection 139 from the stationary jaw 62′; whereas the other or shorter portion of said lever 137 is coupled at 140 by a coordinator 141 to a lug 142 on the outer end of the movable jaw 63′. It will now be self evident to those conversant with such or related devices 61′ that as the piston rod 135 is moved to the left hand of Fig. 19 that the clamping pressure exerted by the movable jaw 63′ on the tubes T will be greatly augmented by the multiplying-lever 137 than would be the case where the pressure influenced cylinder direct-connected to said jaw, as in the showing of Fig. 11.

Turning now to Fig. 18 it will be observed that the track rods 28' are supported by forwardly-directed or over-shot spaced arms 149 integral with the cross-bar 60 of the carriage 58, hereinbefore described, while the associated clamp-device in all respects conforms to that just previously described device 61' and, accordingly, like reference characters are thereto applied. It is to be noted, however, that I am enabled to dispense with the carriage 29 and restraining rollers 30, 31 and adapt the clamp 61' to serve as a combination feed-restrainer means which is arranged to project the leading end or ends of tube T directly into the bight of the bend-forming die elements 17, 17', as readily understood by those conversant with the art. Obviously the pressure fluid cylinder 68' will be coupled-in with the means of Fig. 15 and, accordingly, further description relative thereto is deemed unnecessary herein.

Referring now generally to Figs. 17-22 and, more specifically to Figs. 20-22, which show a preferred bending means for operating on tube T which has not been thoroughly annealed, or is of the larger diameter species. This means, it will be observed, involves opposingly spaced, or lower and upper circular tables or plates 1, 1', see Fig. 20 to best advantage, the lower table 1 being mounted in accordance with the previous description thereof; whereas the upper table 1' is concentrically related and sustained by an overhead annularly-stepped frame 143 with a retainer ring 144 for example. Secured to the relatively confronting faces of the rotatable plates 1, 1' are guides 11, 11' for slide blocks 12, 12' and, between said blocks are pivotally-journaled or stationarily-mounted at 145 grooved die elements or rollers 17, 17' one of which respectively serves to wipe the tube T over or about the groove or grooves 18, of the other roller 17 or 17', to effect compression bending of said tube, whichever of said rollers may have been concentrically shifted into co-axial relation with the center of rotation designated by the dot-and-dash line in Fig. 20 or the blackened-in centers x of Figs. 21 and 22. The compression bending operation effected by the dies or rollers 17, 17' is graphically shown by Fig. 22 and will be readily understood from the preceding operative description without further explanation by those conversant with the art. It is also to be understood that deck provisions are provided for support of the bent tube T, during the cycle of operation of either form of my improved apparatus shown and described, that serve to prevent the bent portions from twisting relative to the general plane of the species shown in Figs. 9 and 16; such provisions however forming no part of the instant invention.

From the foregoing it will be readily appreciated that I may use either the hold-back means 29, 30 of Figs. 1-4 or the combination feeding hold-back means 61' of Figs. 17-19 to equal advantage in connection with either of the die-elements 17, or 17'. Furthermore, it is to be remarked that the foregoing disclosure may be considered as involving two different methods of bending tubes. One of such methods requires clamping the tube T to the dies 17 and then pivoting said dies relative to a definite or fixed center of rotation for the bending of annealed stock, and the other method consisting in holding the dies 17, 17' rigid and one of which functions to effect wiping or compression bending of the tube T about the other. It is also to be remarked that by this invention use of the clamping head 61', Figs. 17-19, in place of the guide rollers 30 positively eliminates "creeping" during the bending operation.

Particular attention is also directed to the fact that the clamp means 61' of Figs. 17-19 may be substituted for the clamp means 40 and thus become a part of the feed mechanism B when desirable, whereupon the jaws 62' and 63' also become a part of said feed mechanism. This arrangement obviates the need of providing an additional fluid-pressure cylinder 68', together with the linkage 137, 141, inasmuch as said linkage might interfere with the movement of the tubing T which has to be bent considerably more than 180°; in order that, when it springs back into shape, it will be exactly 180° and such bent tubing might strike against any projection, such as would exist with the form of clamp device 61', and thereby become liable to form an unsightly kink in the tube T.

It may be also desirable that the die elements 17, 17' should be movable in or out with relation to each other. In this connection I have found that a clearance of ⅛" operates more satisfactorily for ¼" tube, hence I may make the slide blocks 12, 12' in two parts and couple them together, with capacity for relatively aligned adjustment, by aid of screw and lock-nut means 147, 148 respectively, as indicated in Figs. 20 and 21 in an obvious manner.

In conclusion, while the invention has been described by making particular and specific reference to a form thereof at present preferred by me, it is to be expressly understood that a number of changes may be made in the parts thereof as well as other combinations and arrangements effected, without departing from the spirit and full intended scope of said invention, as more tersely expressed in the claims.

Having thus described my invention, I claim:

1. In bar or tube bending apparatus for forming determinate shapes, a rotatable bend-effecting mechanism, means operative to shift the axis of rotation of said mechanism for directional control of its pivotal movement, an intermittently movable feeder for the bar or tube and a straightener feed-arresting device, said mechanism, feeder, and device being aligned; mechanism for timing operation of the aforesaid parts and means; and a control, synchronized with the timing mechanism, whereby the parts and means aforesaid are actuable to complete the desired bending cycle.

2. In a bar or tube bending apparatus for forming definite shapes, a pivotal bend-effecting mechanism, means operative to variably shift the axis of rotation of said mechanism for definite control of the bend effected, an intermittently progressive feeder for the bar or tube, and a straightener feed-arresting device, said mechanism, feeder and device being aligned in a common plane; mechanism for timing operation of the aforesaid parts and means to form desirably related bends with intervening linear runs; and a master control, synchronized with the timing mechanism, whereby the parts and means aforesaid are actuable to complete the desired bending cycle.

3. In bar or tube bending machines for forming a predetermined shape, a variably-pivotal bend-effecting mechanism including reversible means operative to impart equi-angular rotary movement thereto, means operative to shift the pivotal axis of said mechanism to either hand for directional control of the bend effected, an intermittently progressive feeder for the bar or tube, and a combined straightener feed-arresting device for the bar or tube, said mechanism, feeder and device being spacedly aligned in a common horizontal plane; mechanism for timing the requisite operation of the parts aforesaid to form reversely-related bends with intervening straight runs; and a master control, in synchronism with the timing mechanism, whereby the bending mechanism combined straightener and feed-arresting device are individually and variably actuable to complete the desired bending cycle.

4. In a bar or tube bending machine for making definite shapes, a pivotally mounted table, reversible driving means whereby different clockwise-and-counterclockwise rotative movements are imparted to said table; a slidable member on the table, having its axis passing through the center of rotation of said table; spaced uprights on the slidable member having associated bend-forming members thereon with intervening compressible elements, means whereby the slidable member may be variably moved diametrically of the table; guide means shiftable crosswise of the table, effective to direct the leading end of the bar or tube into the bight of the bend-forming members; means for progressively feeding the bar or tube through the guide means and bend-forming members to the desired extent; and a clamp device operative to straighten the bar or tube in advance of its progressive feeding through the bend-forming members and also to arrest such feeding movement when the desired length of bar or tube has advanced beyond said bend-forming members.

5. In a bar or tube bending machine for making definite shapes, a pivotally mounted table, reversible driving means whereby different clockwise and counterclockwise rotative movements are imparted to said table; a slidable member on the table, having its axis normally coinciding with the center of rotation of said table; spaced uprights on the slidable member having associated bend-forming members thereon with intervening compressible elements, means whereby the slidable member may be variably moved diametrically of the table; guide means shiftable crosswise of the table, effective to direct the leading end of the bar or tube into the bight of the bend-forming members; means for progressively feeding the bar or tube through the guide means and bend-forming members to the desired extent; mechanism for timing operation of the parts aforesaid in the desirable sequence; and a master control, in synchronism with the timing mechanism, whereby the bending mechanism, the bar or tube-feeding means and the combined straightener and feed-arresting device are individually and variably activated to complete the desired bending cycle.

6. The invention of claim 5 wherein the pivotal table is rotatively mounted on a hollow stand; wherein said stand houses a reversible motor, a speed-reduction operatively coordinated with said table and an associated brake device; and means whereby rotation of the table is constrained to corresponding angular movement in opposed directions.

7. The invention of claim 5 wherein the slidable member is mounted on the table by aid of a dovetail section guide in turn rigidly secured to said tube; and wherein a pressure-influenced device serves to move the slidable member in opposed directions to each side of the rotative axis of the table.

8. The invention of claim 5 wherein the guide means includes a carriage slidably supported by parallel track members; wherein said track members are supported at their ends by rigid brackets outside the ambit of the pivotally mounted table; and wherein a pressure influenced device moves the carriage in synchronism with the bend-forming member.

9. The invention of claim 5 wherein the means for progressively feeding the bar or tube into position for bending comprises a carriage movable along a plurality of rods rigidly connecting the bend-forming means in spaced alignment with the bar or tube combined straightener and feed-arresting clamp device; wherein the carriage includes a track bar surmounted by stationary and relatively movable jaws effective to grip the bar or tube; wherein a pressure influenced device serves to actuate the movable jaw, and a similar device operates to shift the stationary jaw along the track bar; and wherein the carriage aforesaid is progressed by an operatively-coordinated reversible motor having associated speed reduction and brake mechanisms.

10. The invention of claim 5 wherein the timing mechanism comprises a tri-arm structure with a vertically journaled rotor therein; wherein a motor and associated brake on said structure is operatively coordinated to the rotor; wherein the rotor includes horizontally rotative circular disks, said disks respectively having a plurality of equally-spaced radially-directed holes thereabout for reception of a series of selectively arranged interchangeable indexing pins; and wherein the pin or pins, of the respective disks, coact with limit switches within the confines of the tri-arm structure for the purpose specified.

11. The invention of claim 5 wherein the bar or tube straightener and feed-arresting clamp device comprises a bed component guided in grooved tracks; wherein said bed sustains a stationary and a relatively movable gripping jaws; and wherein individual pressure-influenced devices serve to move the bed component across the machine, and to open and close the movable jaw relative to the stationary jaw.

12. The invention of claim 5 wherein the master control comprises a suitably journaled shaft with a series of vertically-rotative spaced disks fast thereon, and said shaft is coupled at one end to the out-put member of a speed-reduction unit; wherein the in-put member of said unit is directly connected to a drive-motor; wherein each of the rotative disks aforesaid includes circumferentially spaced buttons for selective actuation of control valves governing the admission and exhaust of fluid pressure to cylinder-devices effective to synchronize actuation of the bending-mechanism, the bar or tube feeder, and the combined straightener feed-arresting device with the timing mechanism.

13. In a bending machine of the type described the combination of clamp means operative to straighten-out bar or tube lengths fed thereto; feeding-means for gripping and progressing the bar or tube lengths forwardly; means for stopping the feeding-means at predetermined intervals; means for forming relatively-reverse curved-bends in the bar or tube when the feeding-means is stopped; and a timing-device effective to selectively activate the several means aforesaid to produce a shape embodying circular bends with connecting straight runs.

14. The invention of claim 13 wherein bend-forming means are in the form of spring influenced elongate shaped elements having embossments jointly effective to produce semicircular right and left hand bends with intervening selectively-arranged straight runs of differential lengths.

15. The invention of claim 13 further including means operative to effect formation of right and left hand bends including angles selectively intermediate zero and ninety-degrees with connecting straight runs.

RALPH M. SHAW, JR.

REFERENCES CITED

The following references are of record in the file of this patent:

UNITED STATES PATENTS

| Number | Name | Date |
|---|---|---|
| 227,425 | Geiger | May 11, 1880 |
| 473,455 | Fowler | Apr. 26, 1892 |
| 682,671 | Condon | Sept. 17, 1901 |
| 932,191 | Troisiener | Aug. 24, 1909 |
| 957,203 | Gail | May 10, 1910 |
| 1,333,369 | Bailey | Mar. 9, 1920 |
| 1,546,147 | Skinner | July 14, 1925 |
| 1,575,014 | Snell | Mar. 2, 1926 |
| 1,826,403 | O'Brien | Oct. 6, 1931 |
| 1,873,939 | Mason | Aug. 23, 1932 |
| 1,908,261 | Koenig | May 9, 1933 |
| 2,306,223 | Parker | Dec. 22, 1942 |
| 2,306,224 | Parker | Dec. 22, 1942 |
| 2,331,294 | Bank | Oct. 12, 1943 |
| 2,371,695 | Lancaster | Mar. 20, 1945 |
| 2,382,745 | Powers | Aug. 14, 1945 |
| 2,396,182 | Kibler | Mar. 5, 1946 |

FOREIGN PATENTS

| Number | Country | Date |
|---|---|---|
| 229,203 | Germany | Dec. 3, 1910 |
| 508,444 | France | July 24, 1920 |